Sept. 26, 1950     O. J. ALVAREZ     2,523,641
COOKING DEVICE
Filed Nov. 8, 1946
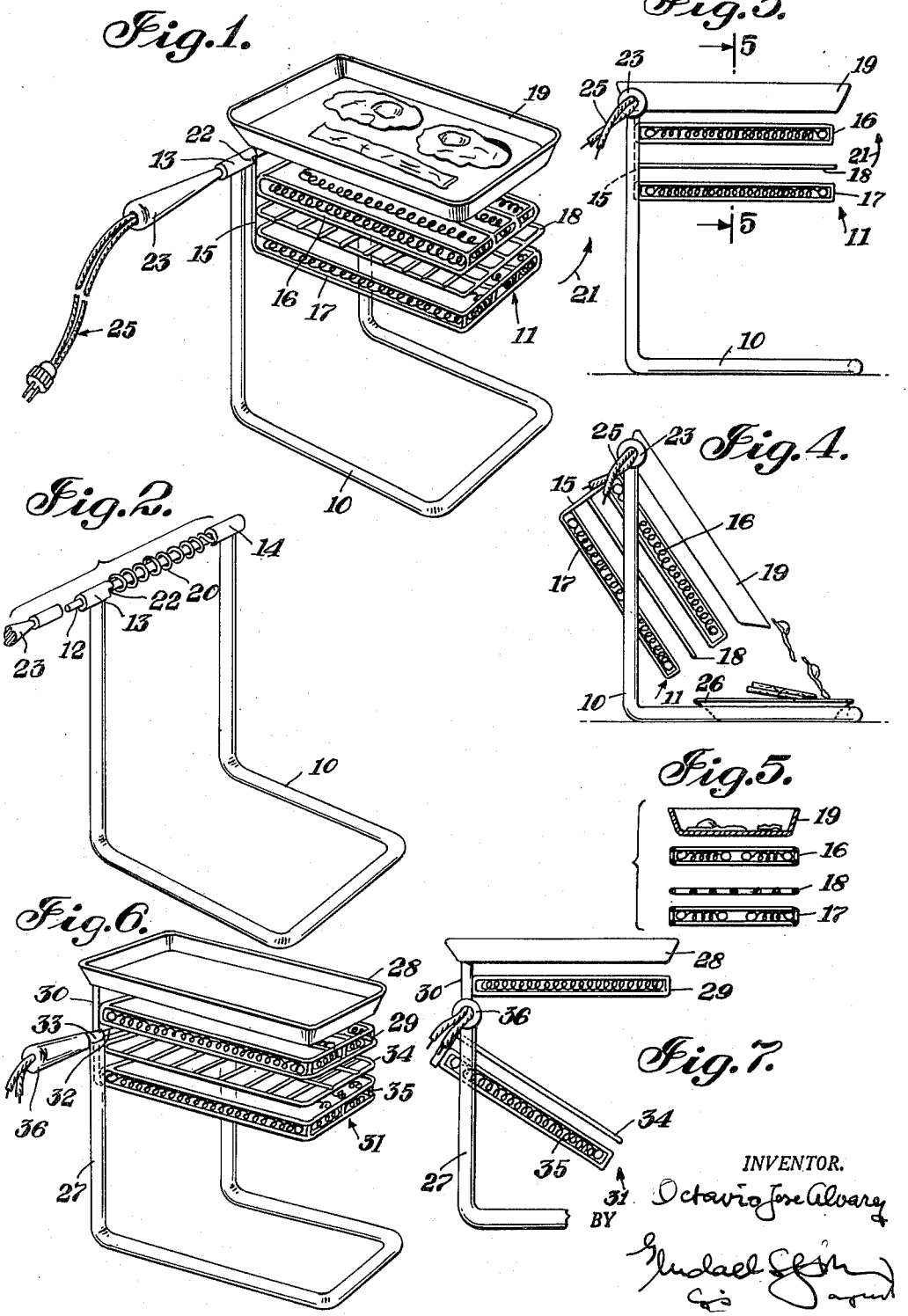

Patented Sept. 26, 1950

2,523,641

UNITED STATES PATENT OFFICE 2,523,641

COOKING DEVICE

Octavio Jose Alvarez, New York, N. Y., assignor to Alvarez Patent Corporation, New York, N. Y.

Application November 8, 1946, Serial No. 708,646

9 Claims. (Cl. 99—393)

My present invention relates to combined cooking devices and more particularly to cooking devices for simultaneously frying and toasting foods.

It is an object of my present invention to provide combined cooking devices of the above type which are very simple in construction and easy to operate.

It is another object of my present invention to provide a combined frying and toasting device which can be operated in such a manner that the fried food is delivered on to the toast.

A further object of my present invention consists of a combined cooking device which can be used for many different purposes.

With the above objects in view my present invention mainly consists of a combined cooking device comprising a cooking unit composed of a flat heating element, a lower food support secured to this flat heating element substantially parallel to the same and at a slight distance from the bottom face thereof, and an upper food support secured to the above mentioned flat heating element substantially parallel to the same and at a slight distance from the top face thereof; this cooking unit is secured by hinge means to a stationary base in such a manner as to be turnable between horizontal position and downward tilted position.

I preferably combine with a combined cooking device of the above type, automatic means, preferably spring means, tending to turn the cooking unit forming part of the combined cooking device about the above mentioned hinge means upward from its downward tilted position into its horizontal position.

Furthermore, I also found it advisable to provide in a combined cooking device of the above type, manually operable operating means combined with the cooking units so that the same might be turned by these operating means from its horizontal position into its downward tilted position.

A preferred embodiment of a combined cooking device according to my present invention, comprises a cooking unit composed of two flat heating elements arranged parallel and spaced from each other, a toaster support secured to these flat heating elements substantially parallel to and between the same and an upper food support, for instance, a griddle secured also to these flat heating elements substantially parallel to the same and at a slight distance from the outer face of one of the heating elements; this cooking unit is mounted by hinge means to a stationary base turnably about a horizontal axis with the upper food support on top of the cooking unit in such a manner as to be turnable about this horizontal axis between horizontal position and downward tilted position.

I found it advisable to incorporate into the cooking unit itself a frame to which the heating elements and the food supports are firmly secured; in this event not the heating elements and the food supports themselves are turnably mounted to the stationary base, but the hinge means form part of the frame, turnably attaching the same to the stationary base as set forth above.

The novel features which I consider as characteristic for my invention are set forth in particular in the appended claims. The invention itself however, both as to its construction and its method of operation, together with additional objects and advantages thereof, will be best understood from the following description of specific embodiments when read in connection with the accompanying drawings, in which:

Fig. 1 is a perspective view of a combined frying and toasting device according to my present invention;

Fig. 2 is a perspective view of the stationary base and the spring means forming part of the device shown in Fig. 1;

Fig. 3 is a side view of the device shown in Fig. 1, seen in direction of arrow 3 of Fig. 5; with the cooking unit in horizontal position;

Fig. 4 is a side view, similar to the front view shown in Fig. 3 of the device shown in Fig. 1, with the cooking unit in downward tilted position;

Fig. 5 is a cross section through the device shown in Figs. 1 and 4, along line 5—5 of Fig. 3;

Fig. 6 is a side view of a modified cooking device similar to the one shown in Figs. 1 to 5, with the cooking unit in horizontal position; and Fig. 7 is also a side view of the device shown in Fig. 6, with the cooking unit in downward tilted position.

The combined cooking device, according to my present invention, shown in Figs. 1 to 5, consists of a stationary base 10 to which the cooking unit 11 is turnably mounted by means of the shaft 12 which is supported by the cylindrical bearings 13 and 14.

The turnable shaft 12 is firmly secured to the frame 15 forming part of the cooking unit 11, and the cylindrical bearings 13 and 14 are firmly secured to the base 10.

Frame 15 carries also the other elements of the cooking unit 11, namely: the two flat heating elements 16 and 17 arranged parallel to and at a slight distance from each other, the grid shaped toaster support 18 arranged between the two heating elements 16 and 17 parallel to and at a slight distance from the same, and the griddle 19 arranged parallel to and at a slight distance over the upper heating element 16.

All above listed elements of the cooking unit 11, namely: the heating elements 16 and 17, the toaster support 18, and the griddle 19 are firmly secured to the frame 15 and their relative position does not change during operation of the cooking device.

The shaft 12 of the cooking unit is surrounded by the spring 20 as clearly shown in Fig. 2; this spring 20 is arranged so as to tend to turn the entire cooking unit upward in direction of arrow 21. In order to limit such upward turning of the cooking unit, stop means 22 are provided on the bearing member 13; these stop means 22 limit the upward turning movement of the cooking unit so that the same is moved by the spring 20 from a downward tilted position into horizontal position and held in this horizontal position as shown in Fig. 3.

The shaft 12 of the cooking unit 11 is provided with a handle 23 by which the entire cooking unit can be turned in direction of arrow 24 from the horizontal position shown in Fig. 3 into the downward tilted position shown in Fig. 4.

The two heating elements 16 and 17 are connected with electric conductor 25 in well known manner.

My above described combined cooking device is operated as follows:

First the electric conductor is connected with the electric circuit so that the heating elements 16 and 17 become heated. While this is done, the cooking unit 11 is in its horizontal position shown in Fig. 3.

Then the bread slices or other food to be toasted are slid on to the toaster support 18 between the two heating elements 16 and 17. Thereafter, the food to be fried or grilled is placed on the griddle 19.

The cooking unit is left with the foods placed thereon in its horizontal position shown in Fig. 3 until the same are duly cooked.

In order to remove the cooked foods from the cooking unit, the same is tilted from its horizontal position shown in Fig. 3 by means of handle 23 in direction of arrow 24 into the downward tilted position shown in Fig. 4.

It is evident that during such downward tilting the food, e. g. the toasted slices of bread and the fried eggs or the like will slide from the toaster support 18 and the griddle 19, respectively, on to a dish or plate 26 placed under the downward tilted cooking unit 11 as clearly shown in Fig. 4.

I wish to note that by properly dimensioning the various elements of the cooking unit, it is possible to have the cooked foods slide from the supports 18 and 19 in proper sequence so that they are lying on plate 26 on each other as desired. Thus, for instance, if slices of bread are placed on the toaster support 18, and eggs and bacon are fried on the griddle 19, it is possible to operate the cooking unit so that during tilting of the same, first the toasted bread slices slide on to the plate 26, and then the fried eggs and bacon slide thereon. After the cooked foods are removed from the cooking device as described above, handle 23 is released and the cooking unit 11 will be turned automatically by means of spring 20 in direction of arrow 21 from its downward tilted position shown in Fig. 4 back into its horizontal position shown in Fig. 3.

In Figs. 6 and 7 I have shown a modified embodiment of a cooking device, according to my present invention:

This modified cooking device comprises also a stationary base 27. However, the top griddle 28 and the upper heating element 29 are firmly mounted in horizontal position to the upper end 30 of this stationary base.

Under the upper heating element 29, the toaster unit 31 is turnably mounted by means of shaft 32 and bearings 33 to the stationary base 27. This toaster unit consists of a toaster support 34 and a lower heating element 35, constructed and arranged as shown.

A spring, not shown in the drawing, serves for turning the entire toaster unit 31 from the downward tilted position shown in Fig. 7 into the horizontal position shown in Fig. 6.

Handle 36 serves for turning the toaster unit 31 from its horizontal into its downward tilted position whenever it is desired to remove the toasted food.

This modified cooking device is operated in the same way as the one shown in Figs. 1 to 5 and described above. The only difference is that the griddle 28 is not turnable and that by turning handle 36 it is possible to turn only the toaster unit 31 thereby causing the toasted foods to slide therefrom. The food fried on the griddle 28 has to be removed in usual manner.

It will be understood that each of the elements described above, or two or more together, may also find a useful application in other types of cooking devices differing from the types described above.

While I have illustrated and described the invention as embodied in cooking devices for frying and toasting foods, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and therefore, such adaptations should, and are intended to be comprehended within the meaning and range of equivalence of the following claims.

What I claim as new and desire to secure by Letters Patent is:

1. A combined cooking device comprising in combination a stationary base; a flat heating element hinged to said base turnably about a horizontal axis between horizontal position and downward tilted position; a lower turnable food support hinged to said stationary base under said flat heating element substantially parallel to the same at a slight distance therefrom and turnable about a horizontal axis between horizontal position and downward tilted position; an upper turnable food support hinged to said stationary base over said flat heating element substantially parallel to the same at a slight distance therefrom turnably about a horizontal axis between horizontal position and downward tilted position; and means for tilting said flat heating element, said lower turnable food support and said upper turnable food support from their horizontal position into their downward tilted position.

2. A combined cooking device comprising in combination a cooking unit composed of a flat heating element, a lower food support secured to said flat heating element substantially parallel to the same and at a slight distance from one face thereof, and an upper food support secured to said flat heating element substantially parallel to the same and at a slight distance from the other face thereof; a stationary base; and hinge means securing said cooking unit to said stationary base turnably between horizontal position and downward tilted position.

3. A combined cooking device comprising in combination a cooking unit composed of a flat heating element, a lower food support secured to said flat heating element substantially parallel to the same and at a slight distance from one face thereof, and an upper food support secured to said flat heating element substantially parallel to the same and at a slight distance from the other face thereof; a stationary base; hinge means securing said cooking unit to said stationary base turnable between horizontal position and downward tilted position; and spring means tending to turn said cooking unit about said hinge means upward from said downward tilted position into said horizontal position.

4. A combined cooking device comprising in combination a cooking unit composed of a flat heating element, a lower food support secured to said flat heating element substantially parallel to the same and at a slight distance from one face thereof, and an upper food support secured to said flat heating element substantially parallel to the same and at a slight distance from the other face thereof; a stationary base; hinge means securing said cooking unit to said stationary base turnably between horizontal position and downward tilted poistion; spring means tending to turn said cooking unit about said hinge means upward from said downward tilted position into said horizontal position; and manually operable operating means combined with said cooking unit adapted to turn said cooking unit from said horizontal position into said downward tilted position.

5. A combined cooking device comprising in combination a cooking unit composed of two flat heating elements arranged parallel and spaced from each other, a toast support secured to said flat heating elements substantially parallel to and between the same, and an upper food support secured also to said flat heating elements substantially parallel to the same and at a slight distance from the other face of one of said heating elements; a stationary base; and hinge means securing said cooking unit to said stationary base with said upper food support on top of said cooking unit and turnable about a horizontal axis between horizontal position and downward tilted position.

6. A combined cooking device comprising in combination a cooking unit composed of two flat heating elements arranged parallel and spaced from each other, a toast support secured to said flat heating elements substantially parallel to and between the same, and an upper food support secured also to said flat heating elements substantially parallel to the same and at a slight distance from the outer face of one of said heating elements; a stationary base; hinge means securing said cooking unit to said stationary base with said upper food support on top of said cooking unit and turnable about a horizontal axis between horizontal position and downward tilted position; automatic means tending to turn said cooking unit about said hinge means upward from said downward tilted position into said horizontal position; and manually operable operating means combined with said cooking unit adapted to turn said cooking unit from said horizontal position into said downward tilted position.

7. A combined cooking device comprising in combination a frame; a flat heating element secured to said frame; a lower food support also secured to said frame substantially parallel to said flat heating element at a slight distance from one face thereof; an upper food support secured also to said frame substantially parallel to said flat heating element at a slight distance from the other face thereof; a stationary base; and hinge means securing said frame to said stationary base with said flat heating element and said food supports turnable between horizontal position and downward tilted position.

8. A combined cooking device comprising in combination a frame; a flat heating element secured to said frame; a lower food support also secured to said frame substantially parallel to said flat heating element at a slight distance from one face thereof; an upper food support secured also to said frame substantially parallel to said flat heating element at a slight distance from the other face thereof; a stationary base; hinge means securing said frame to said stationary base with said flat heating element and said food supports turnable between horizontal position and downward tilted position; means tending to turn said frame about said hinge means upward from a position in which said heating element and said food supports are in downward tilted position into a position in which said heating element and said food supports are in horizontal position; and manually operable operating means combined with said frame adapted to turn the same together with said flat heating element and said food supports from a position in which said flat heating element and said food supports are in horizontal position into a position in which said flat heating element and said food supports are in downward tilted position.

9. A combined cooking device comprising in combination a stationary base; a frame; hinge means securing said frame to said stationary base tiltable between horizontal position and downward tilted position; two flat heating elements secured to said frame parallel and spaced from each other so as to be in horizontal position when said frame is in horizontal position and to be in downward tilted position when said frame is in downward tilted position; a toast support secured also to said frame substantially parallel to and between said flat heating elements so as to be in horizontal position when said frame is in horizontal position and to be in downward tilted position when said frame is in downward tilted position; an upper food support secured also to said frame substantially parallel to and at a slight distance from the upper face of the upper of said heating elements so as to be in horizontal position when said frame is in horizontal position and to be in downward tilted position when said frame is in downward tilted position; manually operable operating means combined with said frame and adapted to turn the same together with said heating elements, said toast support and said upper food support from horizontal position into downward tilted position; and automatic means tending to turn said frame together with said heating elements, said toast support and said upper food support from said downward tilted position into said horizontal position.

OCTAVIO JOSE ALVAREZ.

REFERENCES CITED

The following references are of record in the file of this patent:

UNITED STATES PATENTS

| Number | Name | Date |
|---|---|---|
| 1,102,540 | Onions | July 7, 1914 |
| 1,118,471 | Carlton | Nov. 24, 1914 |
| 1,624,445 | Sutherland | Apr. 12, 1927 |
| 1,769,893 | Uhl | July 1, 1930 |
| 1,952,763 | Lux | Mar. 27, 1934 |
| 2,038,361 | Hawes | Apr. 21, 1936 |
| 2,313,968 | Reich | Mar. 16, 1943 |